US008276525B2

(12) United States Patent
Janssen

(10) Patent No.: US 8,276,525 B2
(45) Date of Patent: Oct. 2, 2012

(54) HEIGHT-ADJUSTABLE EQUIPMENT STAND

(76) Inventor: Rainer Janssen, Paderborn (DE)

( * ) Notice: Subject to any disclaimer, the term of this patent is extended or adjusted under 35 U.S.C. 154(b) by 70 days.

(21) Appl. No.: 12/899,728

(22) Filed: Oct. 7, 2010

(65) Prior Publication Data

US 2011/0083590 A1 Apr. 14, 2011

Related U.S. Application Data

(63) Continuation of application No. PCT/DE2009/000374, filed on Mar. 18, 2009.

(30) Foreign Application Priority Data

Apr. 8, 2008 (DE) .................. 20 2008 004 809 U

(51) Int. Cl.
A47B 3/02 (2006.01)

(52) U.S. Cl. ............ 108/116; 108/20; 108/35; 108/115; 108/145

(58) Field of Classification Search ............ 108/12–129, 108/132, 144.11, 145, 147; 248/150, 165–166, 248/460; 312/258–259
See application file for complete search history.

(56) References Cited

U.S. PATENT DOCUMENTS

| 70,339 | A | | 10/1867 | Kreitz | |
|---|---|---|---|---|---|
| 928,726 | A | * | 7/1909 | Witthaus | 108/129 |
| 2,388,192 | A | * | 10/1945 | Stechbart | 108/35 |
| 2,520,789 | A | * | 8/1950 | Weiss | 108/145 |
| 2,966,322 | A | * | 12/1960 | Robinson | 248/150 |
| 3,000,683 | A | * | 9/1961 | MacNeary | 108/116 |
| 3,137,525 | A | * | 6/1964 | Purser, Jr. | 108/145 |
| 4,651,589 | A | | 3/1987 | Lambert | |
| 5,078,056 | A | * | 1/1992 | McCauley | 108/115 |
| 5,315,935 | A | | 5/1994 | Weisenfels | |
| 6,029,585 | A | * | 2/2000 | Tabayashi | 108/145 |
| 6,053,116 | A | * | 4/2000 | Jung et al. | 108/115 |
| 7,337,728 | B2 | * | 3/2008 | Shabram et al. | 108/35 |
| 7,418,907 | B2 | * | 9/2008 | Haimoff | 108/132 |
| 7,845,708 | B2 | * | 12/2010 | Breidenbach | 296/180.4 |
| 2008/0054149 | A1 | | 3/2008 | Freebairn | |
| 2009/0224129 | A1 | | 9/2009 | Urheim | |

FOREIGN PATENT DOCUMENTS

| DE | 8631449 U1 | 2/1987 |
|---|---|---|
| FR | 806152 | 12/1936 |
| JP | 10099171 A | 4/1998 |
| WO | 2006/135242 A1 | 12/2006 |

OTHER PUBLICATIONS

International Search Report of PCT/DE2009/000374, Dated Jul. 31, 2009.

* cited by examiner

Primary Examiner — Hanh V Tran
(74) Attorney, Agent, or Firm — Laurence A. Greenberg; Werner H. Stemer; Ralph E. Locher

(57) ABSTRACT

A fast height-adjustable equipment stand, particularly for a notebook or for a monitor with a keyboard, which can be placed on a table and a support surface of which can be raised or lowered so low that a keyboard situated on the support surface can be operated without difficulty while sitting. To this end, at any height the equipment present thereon is held in a horizontal or defined oblique position such that the support surface is guided by at least two folding brackets, which cause a parallel guidance of the support surface relative to the base surface in that the edges thereof are fastened non-parallel to each other to the support surface in an articulating manner, and that the support surface can be locked in one or more heights to prevent accidental lowering.

15 Claims, 4 Drawing Sheets

HEIGHT-ADJUSTABLE EQUIPMENT STAND

CROSS-REFERENCE TO RELATED APPLICATION

This is a continuation application, under 35 U.S.C. §120, of copending international application No. PCT/DE2009/000374, filed Mar. 18, 2009, which designated the United States; this application also claims the priority, under 35 U.S.C. §119, of German patent application No. DE 20 2008 004 809.5, filed Apr. 8, 2008; the prior applications are herewith incorporated by reference in their entirety.

BACKGROUND OF THE INVENTION

Field of the Invention

The invention relates to a height-adjustable equipment stand, for a notebook or for a monitor with keyboard in particular, which can be placed on a table and which, when lowered, is flat so that a keyboard situated on the stand can be operated without difficulty, and the support surface of which can be lifted quickly and holds the equipment situated on it in a horizontal or defined oblique position at each height.

When working with personal computers or other equipment for a long time it is desirable and healthy to change one's body position from time to time, e.g. by alternating between sitting and standing positions. Known height-adjustable equipment for this purpose is manufactured mainly in the now described variants.

In a first variant, the entire top plate of a desk is height-adjustable. This construction is usually very expensive and replaces an already existing desk.

Further known variants with swivel arms can be mounted on an existing desktop, normally at the rear or side edge of the desktop, by a clamp. These variants have the disadvantages that they block the space behind the monitor and the keyboard, that even in the lowered position they are optically incommoding, and that because of the supporting arm, which needs to be long and stable, it is not possible to lower the keyboard to a few millimetres above the desktop, so that the user cannot keep arms and hands in their normal position. Moreover, with these variants it is difficult to achieve sufficient stability when working with a keyboard or a mouse.

Other variants, which can be placed on an existing desktop, have one or more of the abovementioned disadvantages or their adjustment to different heights is laborious.

Many construction principles are known for height-adjustable devices. The well-known scissor-type constructions have the disadvantage that they become more unstable with increasing height variation. Also the ends of their scissor arms often glide noisily in a rail and get stuck easily when tilted, and these constructions are normally not very flat.

German utility model DE 8631449.1 indicates a solution for a lifting platform in which the support surface is being held horizontally by two pairs of toggle links which are oriented parallel on the base surface in such a way that their middle flexible connections are simultaneously and evenly pulled inwards by two cable pulls. But this construction requires both links to be folded outwards in the lowered position.

This construction would be disadvantageous for the task of the present invention, because it would unnecessarily take up space on the desktop. The wellknown foldable plastic shopping boxes present a similar solution. The base surface and the upper frame are connected by foldable side panels, but base surface and upper frame are not guided in a parallel manner.

Japanese patent JP 10099171 shows a support surface, which is connected to its base surface by two foldable brackets that are attached to the base and support surfaces by hinges at a 90° angle and thus form a parallel guidance of the support surface.

In this construction, the height of each of the halves of the brackets equals half the distance between base and support surface in a completely lifted position. At least one of the brackets (e.g. the rear left in FIG. 3 of the Japanese patent) can therefore only be as narrow as the difference between the depth of the support surface and half its distance to the base surface in the lifted position. If the support surface measures, for example, 30 cm×45 cm and is lifted to a maximum height of 40 cm, this bracket can thus have a maximum width of 10 cm. With a hinge length this short, the bracket would have to sustain the support surface and maintain its position against an inclination. This requires high material thickness resulting in high weight, and conflicts with the object of low height in a lowered position. This patent does not provide a mechanism for locking quickly at different heights.

SUMMARY OF THE INVENTION

It is accordingly an object of the invention to provide a height-adjustable equipment stand which overcome the above-mentioned disadvantages of the prior art devices of this general type, which is transportable, and which in the lowered position does not incommode in terms of appearance and space requirement, which in this position also allows a user to operate it with his normal arm position and which, at the same time, always holds the equipment on the support surface in a nearly horizontal or defined oblique position during and after height-adjustment, so that they do not slide down.

With the foregoing and other objects in view there is provided, in accordance with the invention a height-adjustable equipment stand for a notebook or a monitor with a keyboard. The height-adjustable equipment stand contains a base surface, at least two collapsible brackets having edges and bracket parts, and a support surface, which can be raised or lowered to a flat position, and guided by the at least two collapsible brackets. The edges of the collapsible brackets are fastened non-parallel to each other to the support surface and the base surface in an articulating manner, and thus at each height cause a defined position of the support surface relative to the base surface. The support surface can be locked in at least one height to prevent accidental lowering. The collapsible brackets are guided towards a centre of the base surface and the support surface when the support surface is lowered. The bracket parts of at least one of the collapsible brackets has cut-outs formed therein into which the bracket parts of at least another of the two collapsible brackets project in at least one height of the support surface. The collapsible brackets do not interfere with each other during lifting and lowering processes of the support surface and do not project beyond an outline of the base surface and the support surface at any height of the support surface.

The task is achieved in that a support surface is guided by at least two foldable brackets which cause a parallel guidance of the support surface relative to the base surface, in that the edges thereof are attached non-parallel to each other to the support surface and the base surface in an articulating manner, and that at least one of the brackets has cutouts into which at least one other bracket part projects in at least one height, wherein the support surface can be locked in at least one height to prevent lowering.

Other features which are considered as characteristic for the invention are set forth in the appended claims.

Although the invention is illustrated and described herein as embodied in a height-adjustable equipment stand, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
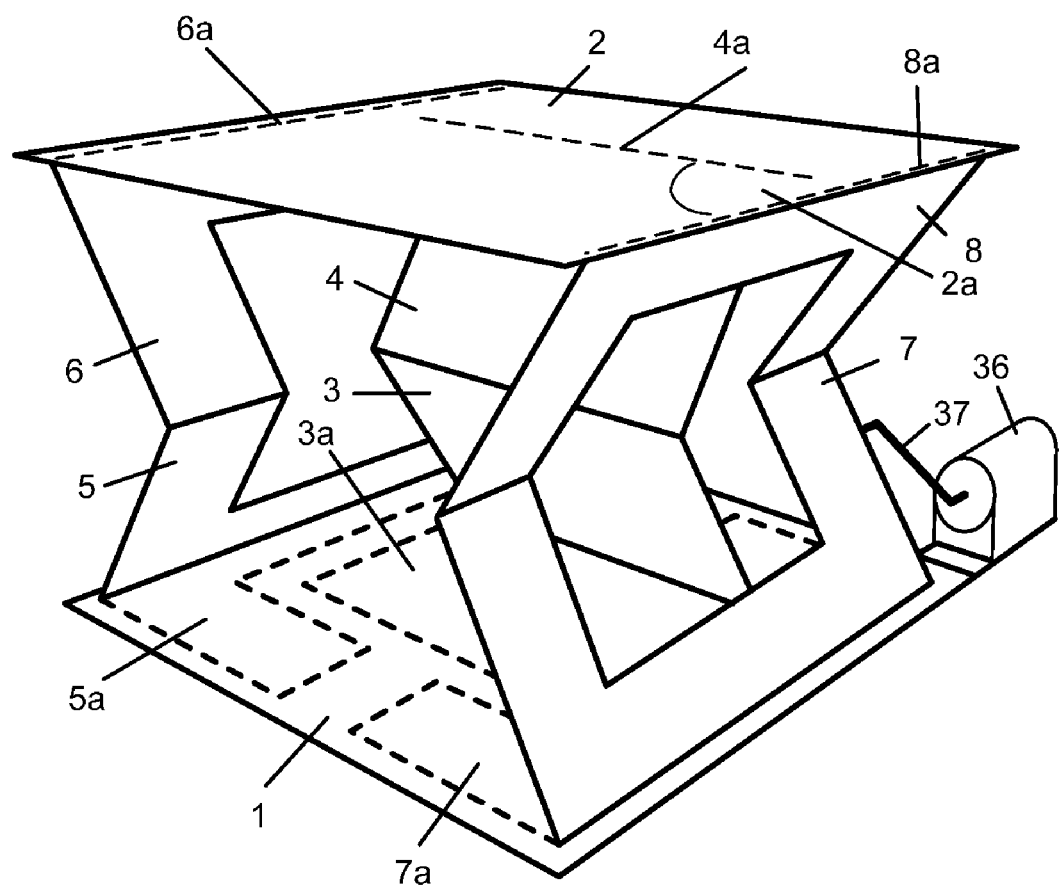
FIG. 1 is a diagrammatic, perspective view for illustrating a basic principle according to the invention.

Referring now to the figures of the drawing in detail and first, particularly, to FIG. 1 thereof, there is shown a base surface 1 and a support surface 2 connected by at least two brackets, in FIG. 1 e.g. by three brackets. The brackets in FIGS. 1 to 5 each are formed of two bracket parts 3 and 4, 5 and 6 or 7 and 8, called bracket halves in the following text, while in FIGS. 6A and 6B e.g. they consist of four bracket parts (18 to 21). The lower half of each bracket is flexibly connected, e.g. by hinges, with the upper half of the bracket. The lower halves 3, 5 and 7 of each bracket are articulated at the base surface 1. The upper halves 4, 6 and 8 of each bracket are also articulated at the support surface 2, with their bracket edges 4a, 6a and 8a.

In the solution according to the invention, parallelism of the base surface and support surface is achieved by the fact that the bracket edge 4a (drawn with dotted lines in FIG. 1) of the bracket 3, 4 is not parallel to at least one of the bracket edges 6a or 8a (drawn with dotted lines) of the other brackets 5, 6 or 7, 8, in the plane of the support surface 2, but that they are arranged at an angle 2a.

Given ideal stiffness of the bracket and surface material and zero clearance of all flexible connections, the parallelism of the support surface 2 to the base surface 1 would be forced in each height. With real material, the angle 2a between two of the bracket edges should advantageously be 90 degrees, for example, as shown in FIG. 1, if both base surface and support surface are rectangular.

For lifting and lowering, the equipment stand can be handled e.g. at the support surface 2. When the support surface 2 is lowered further from the position shown in FIG. 1, the bracket halves 4, 6 and 8 come to lie flat on the corresponding bracket halves 3, 5 and 7. At the lowest position, the support surface 2, with e.g. a keyboard on it, is situated only four times the material thickness of the surfaces 1, 2, 3 and 4 above the desktop on which the equipment stand is placed. If appropriate material is used, this distance need only be a few millimeters.

In another embodiment, the total height of the equipment stand in the lowered position can be further reduced, if the bracket halves 3 to 8 disappear in recesses 3a, 5a, 7a of the base surface 1 and/or the support surface 2, so that the upper surface of the support surface 2 is situated above the desktop surface at a height of only the material thickness of the base surface plus that of the support surface.

In another embodiment, there are not only two but three or more brackets to achieve a higher stability, the material of all parts not being ideal.

In all embodiments, when the stand is lowered, the middle hinges of all brackets move towards the centre of the base surface 1 and the support surface 2. For this purpose the brackets are shaped in such a way, or have such cut-outs, that they do not interfere with each other during lifting and lowering processes.

Furthermore, as shown in FIG. 1, the arrangement and shape of the brackets can be such that they do not project over the edges of the base surface or support surface at any height, thus taking up minimal space on the desktop, and that, given the same overall dimensions of the equipment stand, the total length of the bracket edges 4a plus 6a plus 8a and the torsional moment of the brackets 5, 6 and 7, 8 is significantly higher than it would be with brackets without cutouts.

Figure 2:
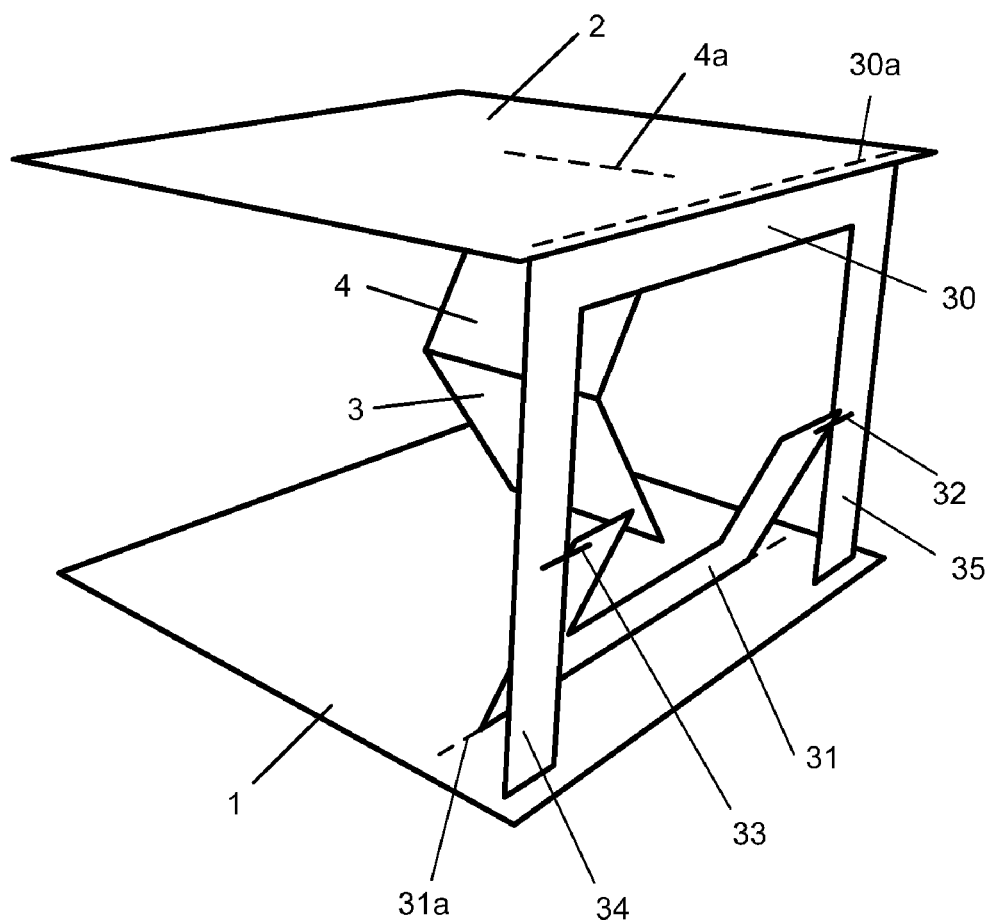
FIG. 2 is a diagrammatic, perspective view of a solid bracket.

In another embodiment, as shown exemplarily for the bracket 30, 31 in FIG. 2, one bracket half 31 disappears in recesses of its corresponding bracket half 30, when the support surface 2 is lowered. This way, the total height of all brackets can be reduced to one material thickness.

In another embodiment, the bracket halves are shaped in such a way, that their upper and lower edges are not parallel to each other. This way, an inclination of the support surface, e.g. towards the user, can be achieved, which increases when the equipment stand is lifted, while the perpendicular direction of the support surface 2 remains horizontal, because the bracket halves 3 and 4 are rectangular. This embodiment can be used, for example, as a portable lectern.

In another embodiment, at least two of the brackets, e.g. 5, 6 and 7, 8, have a different height, consequently also forcing an inclination when lifting the stand, if in this case, for example, the bracket halves 3 and 4 are shaped as rhomboids.

Both embodiments described above can be combined, so that two different inclinations in two different planes are forced when lifting the support surface.

The mechanism for locking the structure at its maximum height and/or at intermediate heights must be such, that the support surface 2 is then in a defined stable condition. For aesthetic reasons, the components of the locking mechanism should advantageously be located between the base surface 1 and the support surface 2 in the lowered position. They should also increase as little as possible the height of the device in the lowered position.

In a further embodiment (FIG. 2) the shape of one bracket half is such, that it is articulated with the support surface 2 at its upper edge 30a and that it contains two bracket arms 34, 35, which in the lifted position are supported on the base surface 1. In FIG. 2, for example, the final position in the lifted position is clearly defined by the articulated connections 32 and 33 with the other bracket half 31, and by the bracket 3, 4. In order to lower the support surface 2, it is lifted up slightly until the bracket half 30 is aligned with the bracket half 31, and then the bracket half 30 is folded further inwards, either manually or, for example, by use of springs, until in the lowered position it is parallel to the base surface and the support surface.

Figure 3:
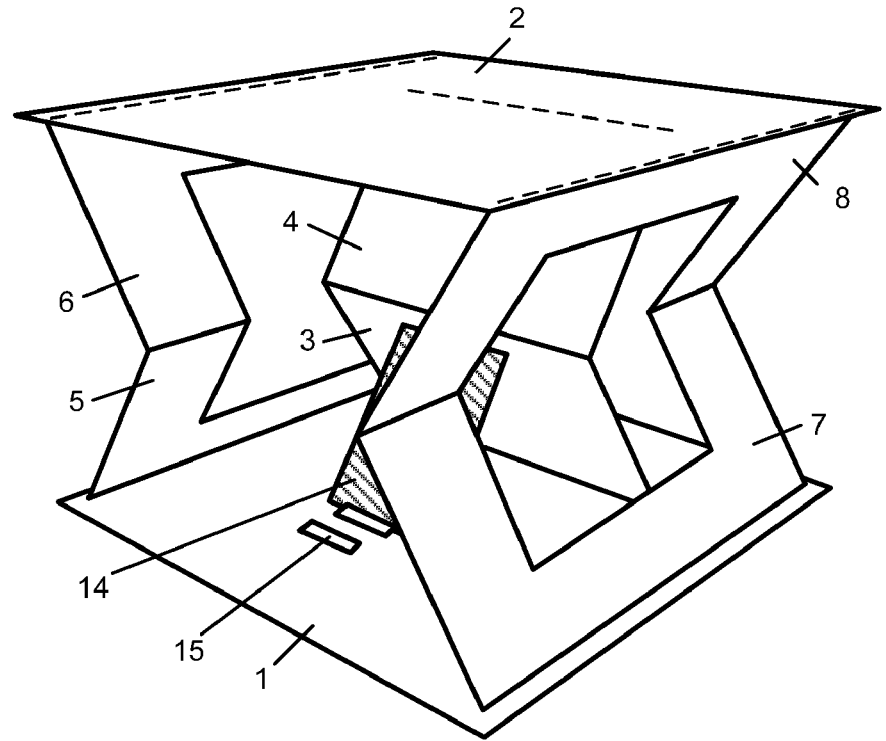
FIG. 3 is a diagrammatic, perspective view of an auxiliary bracket at one of the brackets.

In a further embodiment, locking is achieved by using auxiliary brackets, which like the brackets disappear between the base surface and the support surface when the stand is folded. FIG. 3 shows, by way of example, an auxiliary bracket 14, which is prevented from sliding by one or more notches 15 in the base surface 1, and which supports the bracket half 3. This way, given ideal material, the entire structure can be locked at one or more heights.

Figure 4:
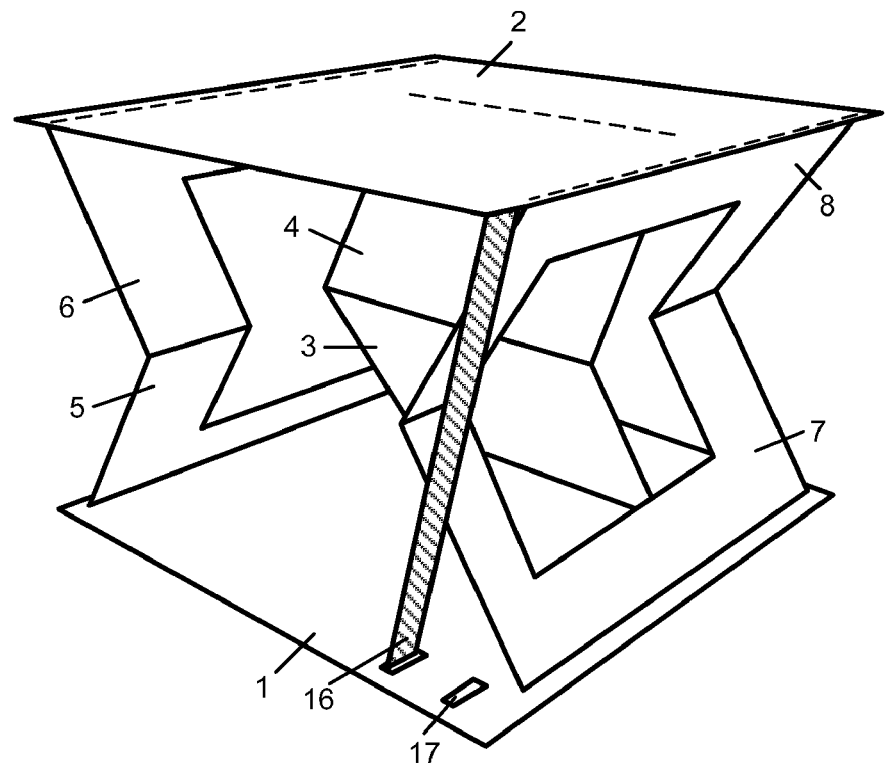
FIG. 4 is a diagrammatic, perspective view of an auxiliary bracket at the support surface.

FIG. 4 shows, by way of example, one of four auxiliary brackets 16 in another embodiment, which support the corners of the support surface 2, and which can engage in one or more notches 17 in the base surface 1. This arrangement is stable even if the material of the brackets is relatively elastic.

In further embodiments, locking can be done by constructional elements which are subjected to tension, such as tie rods, cables or chains, instead of auxiliary brackets. For example, the position of the bracket 30 in FIG. 2 can be achieved without the bracket arms 34 and 35, if a tensioned cable between the articulation 33 and the corresponding articulation of a symmetrically opposed bracket, not shown in FIG. 2, prevents both brackets from moving apart and thus locks the support plate 2.

Figure 5:
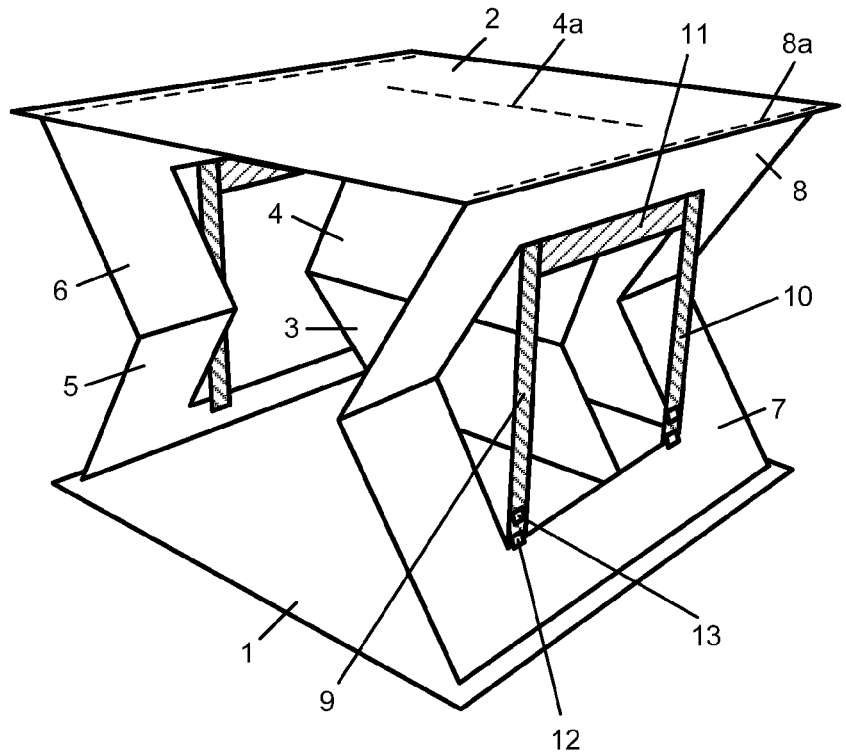
FIG. 5 is a diagrammatic, perspective view of auxiliary brackets with a handle.

FIG. 5 shows a further embodiment, in which, by way of example, the auxiliary bracket 9 is articulated at the upper bracket half 8 and is supported on the lower bracket half 7 by a notch 12. The same applies analogously for the other three auxiliary brackets, which are not shown. As the lower end of the auxiliary bracket 9 is still at a distance to the base surface 1 in a lifted position of the equipment stand, the auxiliary bracket 9 can be locked in lower positions of the equipment stand by additional notches 13. Moreover, such dimensions can be chosen for the brackets and auxiliary brackets, that the auxiliary brackets are vertical at each locked height.

In a further embodiment, the auxiliary brackets 9 and 10 are connected at the top by a handle surface 11, the same applies analogously, for the other side of the equipment stand in FIG. 4. Thus, when the user manually lifts the support surface 2, he or she can press the two auxiliary brackets inwards, respectively with the left and right hand, thereby release the lock and lower the support surface 2 again.

With real material, the most stable position of an equipment stand without auxiliary brackets is achieved when the two halves of each bracket are aligned, because the brackets then only have to absorb compressive forces in their longitudinal direction, and no bending forces. However, this is only the case at the maximum working height of the equipment stand.

Figures 6A, 6B:
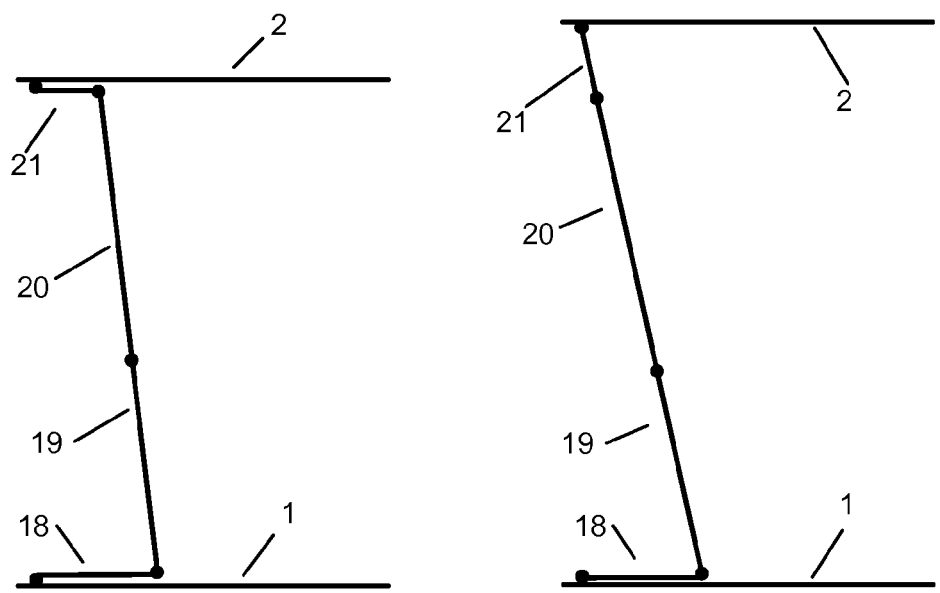
FIGS. 6A and 6B are diagrammatic side views showing brackets made up of several parts.

In order to still achieve different working heights for the equipment stand, each in the most stable position, in a further embodiment the brackets not only consist of two, but of more parts. FIGS. 6A and 6B are side views of a bracket, which by way of example is formed of four parts 18-21, which are articulated. Here, the bracket as a whole consists of the lower bracket half with the bracket parts 18 and 19 and the upper bracket half, the overall height of which is the same, with the bracket parts 20 and 21.

In this example, the PC stand can thus be adjusted to four different working heights, e.g. for users of different body heights. It is adjusted to the lowest working height by fixing the bracket part 18 parallel to the base surface 1 and the bracket part 21 parallel to the support surface 2, wherein the fixation is permanent but can be released again for another user. In FIG. 6A the articulation between the bracket parts 19 and 20 is moved to the right and to the left in order to adjust the height, while the bracket parts 18 and 21 remain fixed. At the maximum working height, the two bracket parts 19 and 20 can then be connected with a suitable locking connection to form a continuous bracket, which is slightly tilted, but which can absorb a large pressure load and which ensures maximum stability of the position of the support surface 2.

A somewhat larger maximum working height is achieved, as shown in FIG. 6B, by permanently connecting the bracket parts 20 and 21 to form a continuous bracket half. An even greater working height is achieved, if instead the bracket parts 18 and 19 are permanently connected to form a bracket half, since the bracket part 18 is longer than the bracket part 21. The highest of the four possible working heights is achieved if both measures are applied jointly.

In a further embodiment, the support surface 2 is brought to a permanent inclination by additional surfaces, which are articulated with the brackets, but rigidly connected to the support surface 2. If the support surface extends beyond the base surface 1, its front edge is lowered a little further, which improves the arm position of the user. This also facilitates mounting a motor drive 36,37 for height adjustment underneath the rear part of the support surface, which is slightly elevated.

In a further embodiment, the equipment stand is incorporated in a tabletop. Due to the low height of the equipment stand, this can be done by working a recess for the equipment stand into the table top from above, with the bottom of the tabletop board remaining intact. Thus, the base of the recess can also function as the base surface 1. In the lowered position, the support surface 2 can then form a common plane with the tabletop surface, and be raised if necessary.

Because of its low height, the equipment stand can be incorporated in the device the working height of which is to be changed, such as a notebook, wherein the base surface 1 can then be a part of the bottom of this device.

The invention claimed is:

1. A height-adjustable equipment stand for a notebook or a monitor with a keyboard, the height-adjustable equipment stand comprising:
   a base surface;
   at least two collapsible brackets having edges and bracket parts;
   a support surface, which can be raised or lowered to a flat position, and guided by said at least two collapsible brackets, said edges of said collapsible brackets being fastened non-parallel to each other to said support surface and said base surface in an articulating manner, and thus at each height cause a defined position of said support surface relative to said base surface, said support surface can be locked in at least one height to prevent accidental lowering; and
   said collapsible brackets are guided towards a center of said base surface and said support surface when said support surface is lowered, said bracket parts of at least one of said collapsible brackets has cut-outs formed therein into which said bracket parts of at least another of said two collapsible brackets project into in at least one height of said support surface, said collapsible brackets do not interfere with each other during lifting and lowering processes of said support surface and do not project beyond an outline of said base surface and said support surface at any height of said support surface.

2. The height-adjustable equipment stand according to claim 1, wherein at least one of said base surface and said support surface has recesses formed therein, and a total height of the equipment stand in a lowered position is reduced, as said collapsible brackets disappear in said recesses.

3. The height-adjustable equipment stand according to claim 1, wherein said bracket parts of one of said collapsible brackets, when lowered, disappears in said cut-outs of said bracket parts of another of said collapsible brackets, so that in a lowered position all of said bracket parts form a common plane.

4. The height-adjustable equipment stand according to claim 1, wherein said bracket parts have lower and upper edges, said lower and upper edges of said bracket parts of at least one of said collapsible brackets are not parallel to each other, so that when said support surface is lifted, an increasing inclination of said support surface in one plane is forced.

5. The height-adjustable equipment stand according to claim 1, wherein one of said brackets is a bracket half with at least one long bracket arm which, in a lifted position, extends from said support surface to said base surface and thereby locks said support surface to prevent accidental lowering.

6. The height-adjustable equipment stand according to claim 1,
wherein at least one of said support surface and said base surface has notches formed therein; and
further comprising at least one auxiliary bracket for locking of said support surface to prevent an accidental lowering, said auxiliary bracket having a first end articulated at said bracket part and a second end supported on or hooked in said notches of one of said base surface and said support surface, for locking in at least one height of said support surface.

7. The height-adjustable equipment stand according to claim 1,
wherein at least one of said support surface and said base surface has notches formed therein; and
further comprising at least one auxiliary bracket and a locking of said support surface to prevent accidental lowering is done by means of said at least one auxiliary bracket, said auxiliary bracket having a first end articulated at one of said support surface and said base surface and a second end supported on or hooked in said notches of one of said base surface and said support surface, for locking in at least one height of said support surface.

8. The height-adjustable equipment stand according to claim 1,
further comprising at least one auxiliary bracket for locking said support surface to prevent accidental lowering, said at least one auxiliary bracket having a first end articulated at a horizontal edge of one of said cut-outs of said bracket part, and a second end with notches formed therein, which, in order to lock, are supported on or hooked at an edge of said cut-out of said corresponding other one of said bracket parts in at least one height of said support surface; and
wherein dimensions of said cut-outs are such, that said auxiliary bracket is vertical at each locked height of said support surface and that in a lowered position it disappears in said cut-outs of said bracket parts.

9. The height-adjustable equipment stand according to claim 1, further comprising a connection selected from the group consisting of a cable connection and a chain connection, a locking said support surface to prevent accidental lowering is done by means of said connection between one of said bracket parts and one of said base surface, said support surface and another one of said bracket parts, which, in its tensioned state prevents folding of said bracket parts in at least one height of said support surface.

10. The height-adjustable equipment stand according to claim 1, further comprising:
a handle surface; and
at least two auxiliary brackets connected in pairs by said handle surface in such a way that they can be moved with one hand, which also handles said support surface for lowering.

11. The height-adjustable equipment stand according to claim 1, wherein the equipment stand locks in place at that height of said support surface, in which said bracket parts of at least one of said collapsible brackets are aligned.

12. The height-adjustable equipment stand according to claim 11, wherein at least one of said collapsible brackets has two equal bracket halves, at least one of said bracket halves is made up of at least two articulated bracket parts, wherein said at least two bracket parts of said bracket half are locked when they are aligned, and wherein at least one of said articulated bracket parts of said bracket half can be locked with one of said base surface and said support surface, so that a maximum operating height of said support surface can be adjusted to different levels.

13. The height-adjustable equipment stand according to claim 1, wherein by means of additional surfaces between said bracket parts and said support surface, said support surface is inclined at a constant angle at all heights.

14. The height-adjustable equipment stand according to claim 1, further comprising a motor drive for adjusting the height.

15. The height-adjustable equipment stand according to claim 1, wherein the equipment stand is configured to be incorporated in a tabletop or in a device with an adjustable working height.

* * * * *